(12) United States Patent
Yamaguchi et al.

(10) Patent No.: US 11,472,953 B2
(45) Date of Patent: Oct. 18, 2022

(54) RESIN COMPOSITION AND MOLDED BODY

(71) Applicant: DAIKIN INDUSTRIES, LTD., Osaka (JP)

(72) Inventors: Shuhei Yamaguchi, Osaka (JP); Ayane Nakaue, Osaka (JP); Masaji Komori, Osaka (JP); Hideki Kono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 159 days.

(21) Appl. No.: 16/605,273

(22) PCT Filed: Apr. 11, 2018

(86) PCT No.: PCT/JP2018/015230
§ 371 (c)(1),
(2) Date: Oct. 15, 2019

(87) PCT Pub. No.: WO2018/190371
PCT Pub. Date: Oct. 18, 2018

(65) Prior Publication Data
US 2020/0123368 A1    Apr. 23, 2020

(30) Foreign Application Priority Data

Apr. 14, 2017   (JP) .............................. JP2017-080963

(51) Int. Cl.
| | |
|---|---|
| *C08L 27/16* | (2006.01) |
| *B29C 45/00* | (2006.01) |
| *B29C 49/00* | (2006.01) |
| *C08L 27/18* | (2006.01) |
| *C08L 33/12* | (2006.01) |

(52) U.S. Cl.
CPC .............. *C08L 27/16* (2013.01); *B29C 45/00* (2013.01); *B29C 49/00* (2013.01); *C08L 27/18* (2013.01); *C08L 33/12* (2013.01); *C08L 2201/10* (2013.01); *C08L 2203/16* (2013.01)

(58) Field of Classification Search
CPC ...................................................... C08L 27/16
See application file for complete search history.

(56) References Cited

U.S. PATENT DOCUMENTS

| | | | |
|---|---|---|---|
| 4,710,426 A | 12/1987 | Stephens | |
| 4,770,939 A * | 9/1988 | Sietses | B05D 5/083 427/195 |
| 4,861,835 A | 8/1989 | Maeda et al. | |
| 5,042,924 A * | 8/1991 | Terasaki | C08J 5/18 252/585 |
| 5,130,201 A * | 7/1992 | Yoshimura | C08L 27/16 428/413 |
| 5,599,873 A * | 2/1997 | Verwey | C09D 127/16 524/545 |
| 6,251,506 B1 * | 6/2001 | Davis | B32B 27/288 428/213 |
| 7,147,922 B2 * | 12/2006 | Tsuda | B32B 27/30 428/421 |
| 8,722,791 B2 * | 5/2014 | Saito | H01L 31/049 524/520 |
| 11,136,440 B2 * | 10/2021 | Sato | C08L 25/06 |
| 2005/0019584 A1 | 1/2005 | Tsuda et al. | |
| 2013/0202847 A1 | 8/2013 | Konokawa et al. | |
| 2014/0235783 A1 | 8/2014 | Iida et al. | |
| 2017/0096553 A1 | 4/2017 | Ikawa et al. | |

FOREIGN PATENT DOCUMENTS

| | | |
|---|---|---|
| JP | 63-159459 A | 7/1988 |
| JP | 02-102252 A | 4/1990 |
| JP | 2005-42066 A | 2/2005 |
| JP | 2009-061401 A | 3/2009 |
| JP | 2013-082925 A | 5/2013 |
| JP | 2014-152186 A | 8/2014 |
| WO | 2011/142453 A1 | 11/2011 |
| WO | 2012/036297 A1 | 3/2012 |
| WO | 2015/146752 A1 | 10/2015 |

OTHER PUBLICATIONS

Communication dated Jan. 11, 2021, from the European Patent Office in application No. 18784843.7.
International Search Report for PCT/JP2018/015230 dated Jun. 19, 2018 [PCT/ISA/210].
International Preliminary Report on Patentability dated Oct. 15, 2019 from the International Bureau in application No. PCT/JP2018/015230.

\* cited by examiner

*Primary Examiner* — Irina Krylova
(74) *Attorney, Agent, or Firm* — Sughrue Mion, PLLC

(57) ABSTRACT

A resin composition containing a fluorine-containing polymer and a methacrylate resin. The fluorine-containing polymer and the methacrylate resin have a mass ratio of 35/65 to 95/5. The fluorine-containing polymer contains a vinylidene fluoride unit and a tetrafluoroethylene unit. The vinylidene fluoride unit and the tetrafluoroethylene unit have a mole ratio of 81/19 to 99/1. Also disclosed is a molded article containing the resin composition.

4 Claims, No Drawings

RESIN COMPOSITION AND MOLDED BODY

CROSS REFERENCE TO RELATED APPLICATIONS

This application is a National Stage of International Application No. PCT/JP2018/015230 filed Apr. 11, 2018, claiming priority based on Japanese Patent Application No. 2017-080963 filed Apr. 14, 2017.

TECHNICAL FIELD

The invention relates to resin compositions and molded articles.

BACKGROUND ART

Vinylidene fluoride resin has miscibility with methacrylate resin, so that there are known techniques of blending vinylidene fluoride resin and methacrylate resin.

For example, Patent Literature 1 discloses a method for molding a vinylidene fluoride resin containing 50 to 100 parts by weight of a vinylidene fluoride resin and 0 to 50 parts by weight of a methacrylate resin, as well as 1 to 10 parts by weight of an acrylic processing aid for common vinyl chloride resin and 0.5 to 3.0 parts by weight of a high molecular weight acrylic lubricant.

Patent Literature 2 discloses a resin composition containing 5% by mass or more and 65% by mass or less of the following polymer X and 35% by mass or more and 95% by mass or less of the following polymer Y, wherein the polymer X is a vinylidene fluoride resin; and the polymer Y is a copolymer having a domain (y1) which is miscible with the polymer X and a domain (y2) which is immiscible with the polymer X.

Patent Literature 2 also discloses that the domain (y1) or the domain (y2) preferably contains a macromonomer unit and the macromonomer unit preferably contains a methyl methacrylate unit.

CITATION LIST

Patent Literature

Patent Literature 1: JP H02-102252 A
Patent Literature 2: WO 2015/146752

SUMMARY OF INVENTION

Technical Problem

The invention aims to provide a resin composition and a molded article having a high tensile elongation and excellent transparency.

Solution to Problem

The inventors found that blending a fluorine-containing polymer having a specific composition and a methacrylate resin provided a resin composition and a molded article having a high tensile elongation and excellent transparency, thereby completing the invention.

Specifically, the invention relates to a resin composition containing a fluorine-containing polymer and a methacrylate resin, the fluorine-containing polymer and the methacrylate resin having a mass ratio of 35/65 to 95/5, the fluorine-containing polymer containing a vinylidene fluoride unit and a tetrafluoroethylene unit, the vinylidene fluoride unit and the tetrafluoroethylene unit having a mole ratio of 81/19 to 99/1.

In the resin composition of the invention, preferably, the mass ratio is 45/55 to 85/15 and the mole ratio is 85/15 to 96/4.

In the resin composition of the invention, the fluorine-containing polymer preferably has a melt flow rate of 0.1 to 100 g/10 min.

The resin composition of the invention preferably has a tensile elongation of 30% or higher measured at a tensile rate of 100 mm/min and a light transmittance of 82.0% T or higher at a wavelength of 550 nm measured using a spectrophotometer.

The invention also relates to a molded article containing the aforementioned resin composition.

Advantageous Effects of Invention

The resin composition of the invention has a high tensile elongation and excellent transparency.

The molded article of the invention has a high tensile elongation and excellent transparency.

DESCRIPTION OF EMBODIMENTS

The invention will be specifically described hereinbelow.

A feature of the resin composition of the invention is that the resin composition contains a fluorine-containing polymer and a methacrylate resin, and the fluorine-containing polymer and the methacrylate resin have a mass ratio (fluorine-containing polymer/methacrylate resin) of 35/65 to 95/5.

The mass ratio is preferably 45/55 to 85/15, more preferably 55/45 to 75/25, still more preferably 65/35 to 75/25.

The mass ratio is also preferably 45/55 to 85/15, more preferably 55/45 to 75/25, still more preferably 65/35 to 75/25. A higher proportion of the fluorine-containing polymer leads to a material having a high tensile elongation.

The mass ratio is also preferably 35/65 to 55/45, more preferably 35/65 to 45/55. A higher proportion of the methacrylate resin leads to a material of which the tensile elongation is higher than that of the methacrylate resin and is well balanced with the tensile stress.

Another feature of the resin composition of the invention is that the resin composition contains the fluorine-containing polymer and the fluorine-containing polymer contains a vinylidene fluoride unit and a tetrafluoroethylene unit and the vinylidene fluoride unit and the tetrafluoroethylene unit have a mole ratio (vinylidene fluoride unit/tetrafluoroethylene unit) of 81/19 to 99/1.

The mole ratio is preferably 85/15 to 96/4, more preferably 88/12 to 95/5, still more preferably 91/9 to 94/6.

In the present description, the amounts of the monomer units can be calculated by appropriate combination of NMR and elemental analysis in accordance with the types of the monomers.

In addition to the vinylidene fluoride unit and the tetrafluoroethylene unit, the fluorine-containing polymer may further contain a polymerized unit based on a monomer copolymerizable with vinylidene fluoride and tetrafluoroethylene. A copolymer of vinylidene fluoride and tetrafluoroethylene is sufficient to achieve the effects of the invention. Still, a monomer copolymerizable with vinylidene fluoride and tetrafluoroethylene may also be copolymerized to the extent that the excellent transparency and tensile elongation of the resin composition containing the above copolymer are not impaired.

In the fluorine-containing polymer, preferably, the sum of the vinylidene fluoride unit and the tetrafluoroethylene unit represents 60 to 100 mol %, while the polymerized unit based on a monomer copolymerizable with vinylidene fluoride and tetrafluoroethylene represents 0 to 40 mol %, in 100 mol % of all polymerized units. More preferably, the sum of the vinylidene fluoride unit and the tetrafluoroethylene unit represents 80 to 100 mol %, while the polymerized unit based on a monomer copolymerizable with vinylidene fluoride and tetrafluoroethylene represents 0 to 20 mol %, in 100 mol % of all polymerized units.

Examples of the monomer copolymerizable with vinylidene fluoride and tetrafluoroethylene include fluorine-containing olefins such as chlorotrifluoroethylene, trifluoroethylene, monofluoroethylene, hexafluoropropylene, and perfluoro(alkyl vinyl ethers); fluorine-containing acrylates; and fluorine-containing monomers containing a functional group.

Examples of the monomer copolymerizable with vinylidene fluoride and tetrafluoroethylene include unsaturated dibasic acid monoesters as disclosed in JP H06-172452 A, such as monomethyl maleate, monomethyl citraconate, monoethyl citraconate, maleic acid, maleic anhydride, and vinylene carbonate, and compounds as disclosed in JP H07-201316 A, i.e., compounds containing a hydrophilic polar group such as —$SO_3M$, —$OSO_3M$, —COOM, or —$OPO_3M$ (wherein M is an alkali metal), an amine-type polar group, e.g., —$NHR^a$ or —$NR^bR^c$ (wherein $R^a$, $R^b$, and $R^c$ are each an alkyl group), an amide group, e.g., —CO—NRR' (wherein R and R' are the same as or different from each other, and are each a hydrogen atom or an alkyl group optionally containing a substituent), an amide bond, e.g., —CO—NR"— (wherein R" is a hydrogen atom, an alkyl group optionally containing a substituent, or a phenyl group optionally containing a substituent), or a carbonyl group. Preferred among these compounds containing a hydrophilic polar group are compounds containing an amide group and a carbonyl group, particularly preferred are compounds containing an amide group.

In a compound containing an amide group, the amide group is a group represented by —CO—NRR'. R and R' are the same as or different from each other, and are each a hydrogen atom or an alkyl group optionally containing a substituent. When R and R' are alkyl groups, they each may be linear, cyclic, or branched. The alkyl groups each preferably contain 1 to 30, more preferably 1 to 20 carbon atoms. Examples of the substituent include halogen atoms, C1-C30 alkoxy groups, and C6-C30 aryl group.

The compound containing an amide group may be any compound containing one or more polymerizable carbon-carbon double bonds and one or more amide groups in the molecule, and is preferably a monomer containing one polymerizable carbon-carbon double bond and one amide group in the molecule represented by the following formula (1):

[Chem. 1]

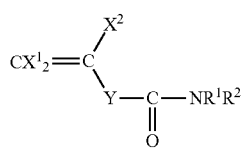

(1)

(wherein $X^1$s are the same as or different from each other, and are each a hydrogen atom or an alkyl group optionally containing a substituent; $X^2$ is a hydrogen atom or an alkyl group optionally containing a substituent; Y is a single bond or an alkylene group optionally containing a substituent; and $R^1$ and $R^2$ are the same as or different from each other, and are each a hydrogen atom or an alkyl group optionally containing a substituent). In the formula (1), $X^1$ is a hydrogen atom or an alkyl group. In the formula (1), the two $X^1$s may be the same as or different from each other. The alkyl group may or may not contain a substituent. The alkyl group may be linear, cyclic, or branched. Examples of the alkyl group include those mentioned for the above R and R'.

$X^1$ is preferably a hydrogen atom or a halogen atom, particularly preferably a hydrogen atom. In the formula (1), $X^2$ is a hydrogen atom or an alkyl group. The alkyl group may or may not contain a substituent. The alkyl group may be linear, cyclic, or branched. Examples of the alkyl group include those mentioned for the above $X^1$. $X^2$ is preferably a hydrogen atom or a methyl group. In the formula (1), Y is a single bond or an alkylene group. The alkylene group may or may not contain a substituent. The alkylene group may be linear, cyclic, or branched. The alkylene group preferably contains 1 to 30, more preferably 1 to 25 carbon atoms.

Examples of the substituent include those mentioned for the above $X^1$. In the formula (1), $R^1$ and $R^2$ are each a hydrogen atom or an alkyl group. $R^1$ and $R^2$ may be the same as or different from each other. The alkyl group may or may not contain a substituent. The alkyl group may be linear, cyclic, or branched. Examples of the alkyl group include those mentioned for the above $X^1$. $R^1$ and $R^2$ are each preferably a hydrogen atom or a halogen atom, particularly preferably a hydrogen atom.

The compound containing an amide group is preferably a (meth)acrylamide compound represented by the following formula (2):

[Chem. 2]

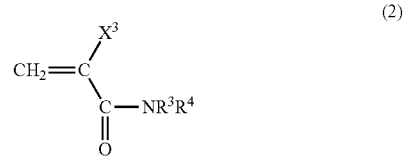

(2)

(wherein $X^3$ is a hydrogen atom or a methyl group; and $R^3$ and $R^4$ are the same as or different from each other, and are each a hydrogen atom or an alkyl group optionally containing a substituent). In the formula (2), specific examples of $R^3$ and $R^4$ include those mentioned for $R^1$ and $R^2$ in the formula (1).

Examples of the (meth)acrylamide compound include (meth)acrylamide and derivatives thereof. Specific examples thereof include (meth)acrylamide, N-methyl (meth)acrylamide, N-isopropyl (meth)acrylamide, N-tert-butyl (meth)acrylamide, N-phenyl (meth)acrylamide, N-methoxymethyl (meth)acrylamide, N-butoxymethyl (meth)acrylamide, 4-acryloylmorpholine, diacetone (meth)acrylamide, N,N-dimethyl (meth)acrylamide, N,N-diethyl (meth)acrylamide, and 2-(meth)acrylamide-2-methyl propanesulfonic acid. Particularly preferred among these is N-tert-butyl (meth)acrylamide.

In a compound containing an amide bond, the amide bond is a bond represented by —CO—NR"—, and may be a bond represented by —CO—NR"—CO—. R" is a hydrogen atom, an alkyl group optionally containing a substituent, or a phenyl group optionally containing a substituent. Examples of the alkyl group and of the substituent may include the same alkyl groups and the same substituents mentioned for R in the compound containing an amide group. Examples of the compound containing an amide bond include N-vinyl acetamide and N-vinyl acetamide derivatives such as N-methyl-N-vinyl acetamide; and maleimide and maleimide derivatives such as N-butyl maleimide and N-phenyl maleimide. Preferred among these is N-vinyl acetamide.

Examples of the monomer copolymerizable with vinylidene fluoride and tetrafluoroethylene also include $CH_2=CH-CH_2-Y$, $CH_2=C(CH_3)-CH_2-Y$, $CH_2=CH-CH_2-O-CO-CH(CH_2COOR^d)-Y$, $CH_2=CH-CH_2-O-CH_2-CH(OH)-CH_2-Y$, $CH_2=C(CH_3)-CO-O-CH_2-CH_2-CH_2-Y$, $CH_2=CH-CO-CH_2-CH_2-Y$, and $CH_2=CHCO-NH-C(CH_3)_2-CH_2-Y$ (wherein Y is a hydrophilic polar group; and $R^d$ is an alkyl group). $CH_2=CH-CH_2-O-(CH_2)_n-OH$ (wherein $3 \le n \le 8$) may also be used.

Any of hydroxylated allyl ether monomers such as

[Chem. 3]

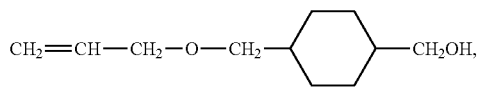

$CH_2=CH-CH_2-O-(CH_2-CH_2-O)_n-H$ (wherein $1 \le n \le 14$) and $CH_2=CH-CH_2-O-(CH_2-CH(CH_3)-O)_n-H$ (wherein $1 \le n \le 14$), and allyl ether or ester monomers carboxylated and/or substituted with $(CF_2)_n-CF_3$ (wherein $3 \le n \le 8$), such as $CH_2=CH-CH_2-O-CO-C_2H_4-COOH$, $CH_2=CH-CH_2-O-CO-C_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$ may also be used as the copolymerizable monomer.

The studies performed so far make it possible to infer that even compounds other than the aforementioned compounds containing a polar group, for example, can give transparency and flexibility to a resin composition by slightly reducing the crystallinity of a copolymer of vinylidene fluoride and tetrafluoroethylene. This enables the use of any of unsaturated hydrocarbon monomers such as ethylene and propylene ($CH_2=CHR$, wherein R is a hydrogen atom, an alkyl group, or a halogen such as Cl), fluorine monomers such as chlorotrifluoroethylene, hexafluoropropylene (HFP), hexafluoroisobutene, 2,3,3,3-tetrafluoropropene, $CF_2=CF-O-C_nF_{2n+1}$ (wherein n is an integer of 1 or greater), $CH_2=CF-C_n-F_{2n+1}$ (wherein n is an integer of 1 or greater), $CH_2=CF-(CF_2CF_2)_nH$ (wherein n is an integer of 1 or greater), and $CF_2=CF-O-(CF_2CF(CF_3)O)_m-C_nF_{2n+1}$ (wherein m and n are each an integer of 1 or greater).

Further, fluorine-containing ethylenic monomers containing at least one functional group represented by the following formula:

[Chem. 4]

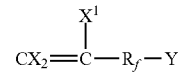

(wherein Y is $-CH_2OH$, $-COOH$, a carboxylic acid salt, a carboxy ester group, or an epoxy group; X and $X^1$ are the same as or different from each other, and are each a hydrogen atom or a fluorine atom; and $R_f$ is a C1-C40 divalent fluorine-containing alkylene group or a C1-C40 divalent fluorine-containing alkylene group containing an ether bond) may also be used.

As described above, the fluorine-containing polymer may contain a different polymerized unit in addition to the vinylidene fluoride unit and the tetrafluoroethylene unit. Still, the fluorine-containing polymer more preferably consists only of the vinylidene fluoride unit and the tetrafluoroethylene unit.

The fluorine-containing polymer preferably has a melting point of 100° C. to 165° C., more preferably 110° C. to 160° C., still more preferably 115° C. to 155° C.

The melting point is determined as the temperature corresponding to the maximum value on a heat-of-fusion curve obtained using a differential scanning calorimeter (DSC) by increasing the temperature up to 200° C., decreasing the temperature down to 50° C., and again increasing the temperature up to 200° C., at a rate of 10° C./min.

The fluorine-containing polymer preferably has a melt flow rate (MFR) of 0.1 g/10 min or higher, more preferably 1.0 g/10 min or higher, still more preferably 5.0 g/10 min or higher. The MFR of the fluorine-containing polymer is preferably 100 g/10 min or lower, more preferably 50 g/10 min or lower, still more preferably 30 g/10 min or lower. The MFR of the fluorine-containing polymer is preferably 0.1 to 100 g/10 min, more preferably 1.0 to 50 g/10 min, still more preferably 5.0 to 30 g/10 min. An MFR lower than the above range may cause a significantly reduced moldability. An MFR higher than the above range may cause a failure in exhibiting the transparency after melt-kneading and a significantly reduced mechanical strength.

The MFR of the fluorine-containing polymer is determined at a temperature of 230° C. and a load of 5 kg using a melt index tester in conformity with ASTM D 1238.

The methacrylate resin is a resin containing a methacrylate unit. The methacrylate resin preferably includes at least one selected from the group consisting of a homopolymer of methyl methacrylate and copolymers of methyl methacrylate and a different comonomer.

Examples of the different comonomer include polymers containing a unit of any of monomers, including alkyl (meth)acrylates such as methyl acrylate, ethyl (meth)acrylate, n-propyl (meth)acrylate, i-propyl (meth)acrylate, i-butyl (meth)acrylate, t-butyl (meth)acrylate, n-pentyl (meth)acrylate, n-hexyl (meth)acrylate, cyclohexyl (meth)acrylate, n-octyl (meth)acrylate, dodecyl (meth)acrylate, stearyl (meth)acrylate, isobornyl (meth)acrylate, 2-hydroxyethyl (meth)acrylate, and benzyl (meth)acrylate; aromatic vinyl monomers such as styrene, α-methylstyrene, p-methylstyrene, o-methylstyrene, and t-butylstyrene; vinyl cyanide monomers such as acrylonitrile and methacrylonitrile; glycidyl group-containing monomers such as glycidyl (meth)acrylate; vinyl carboxylate monomers such as vinyl butyrate; olefinic monomers such as ethylene, propylene, and isobutylene; diene monomers such as butadiene and isoprene; and unsaturated carboxylic acids such as maleic acid and maleic anhydride. The term "(meth)acrylate" herein means "acrylate" or "methacrylate".

The methacrylate resin may be a resin with no melting point detected. The presence or absence of the melting point can be confirmed by the presence or absence of the maximum value on a heat-of-fusion curve obtained using a differential scanning calorimeter (DSC) by increasing the temperature up to 200° C., decreasing the temperature down to 50° C., and again increasing the temperature up to 200° C., at a rate of 10° C./min.

The methacrylate resin preferably has a melt flow rate (MFR) of 0.1 g/10 min or higher, more preferably 0.5 g/10 min or higher, still more preferably 1 g/10 min or higher. The MFR of the methacrylate resin is preferably 100 g/10 min or lower, more preferably 70 g/10 min or lower, still more preferably 50 g/10 min or lower. The MFR of the methacrylate resin is preferably 0.1 to 100 g/10 min, more preferably 0.5 to 70 g/10 min, still more preferably 1.0 to 50 g/10 min. An MFR lower than the above range may cause a significantly reduced moldability. An MFR higher than the above range may cause a failure in exhibiting the transparency after melt-kneading and a significantly reduced mechanical strength.

The MFR of the methacrylate resin is determined at a temperature of 230° C. and a load of 5 kg using a melt index tester in conformity with ASTM D 1238.

The resin composition may also contain any of other components such as a filler, a plasticizer, a processing aid, a release agent, a pigment, a flame retarder, a lubricant, a photostabilizer, a weather-resistance stabilizer, a heat-resistance stabilizer, an anti-blocking agent, an antibacterial agent, a fungicide, a blueing agent, a conductive agent, an antistatic agent, an ultraviolet absorber, an antioxidant, a blowing agent, a fragrance, an oil, a softening agent, and a dehydrofluorination agent, to the extent that the objects of the invention are not impaired.

The resin composition may contain 95 to 100% by mass, 97% by mass or more, and 99% by mass or more in total of the fluorine-containing polymer and the methacrylate resin. The phrase "contain 100% by mass of the fluorine-containing polymer and the methacrylate resin" means that the resin composition contains substantially none of the other components.

The resin composition exhibits a compatibilizing system in part of the composition range, and thus may be a resin composition with no melting point detected. The melting point, when detected, is preferably 100° C. to 165° C., more preferably 110° C. to 160° C., still more preferably 115° C. to 155° C. The melting point is determined as the temperature corresponding to the maximum value on a heat-of-fusion curve obtained using a differential scanning calorimeter (DSC) by increasing the temperature up to 200° C., decreasing the temperature down to 50° C., and again increasing the temperature up to 200° C., at a rate of 10° C./min.

The resin composition preferably has a MFR of 0.1 to 100 g/10 min, more preferably 0.5 to 70 g/10 min, still more preferably 1.0 to 50 g/10 min. The MFR is determined at a temperature of 230° C. and a load of 5 kg using a melt index tester in conformity with ASTM D 1238.

The resin composition has a high tensile elongation, and thus elongates well. The resin composition may have a tensile elongation at 23° C. of 30% or higher, more preferably 50% or higher, still more preferably 70% or higher. The tensile elongation can be determined by a tensile test at a temperature of 23° C. and a test speed of 100 mm/min using a dumbbell piece (ASTM type V) prepared from the resin composition by injection molding.

The resin composition has a high light transmittance, and thus has excellent transparency. The resin composition may have a light transmittance at a wavelength of 550 nm of 82.0% T or higher, more preferably 84.0% T or higher, still more preferably 86.0% T or higher. The resin composition having a transmittance lower than the above value may fail to have sufficient transparency. The transmittance can be determined using a spectrophotometer by applying light at a wavelength of 550 nm to a 1-mm-thick sheet prepared from the resin composition by compression molding.

The resin composition preferably has a tensile elongation of 30% or higher measured at a tensile rate of 100 mm/min and a light transmittance of 82.0% T or higher at a wavelength of 550 nm measured using a spectrophotometer. Such a resin composition having both a high tensile elongation and a high light transmittance has never been known previously. The resin composition more preferably has a tensile elongation of 40% or higher measured at a tensile rate of 100 mm/min and a light transmittance of 83.0% T or higher at a wavelength of 550 nm measured using a spectrophotometer. The resin composition still more preferably has a tensile elongation of 50% or higher measured at a tensile rate of 100 mm/min and a light transmittance of 84.0% T or higher at a wavelength of 550 nm measured using a spectrophotometer. The resin composition is useful for a variety of optical applications.

The resin composition may be in the form of, but not limited to, powder, flakes, pellets, or the like. In order to easily produce the resin composition and to achieve excellent handleability, pellets are preferred.

The resin composition can be prepared by mixing the fluorine-containing polymer and the methacrylate resin. The mixing may be performed using a mixer such as a blending mill, a Banbury mixer, a Henschel mixer, a pressure kneader, or an extruder. In order to easily sufficiently mix the resins, a twin-screw extruder is preferred.

In order to mix the resins sufficiently, the mixing is preferably performed with the resins in a molten state. For example, the resins can be molten by heating the resins up to a temperature that is not lower than the higher of the melting point of the fluorine-containing polymer and the melting point or softening point of the methacrylate resin.

The invention also relates to a molded article containing the above resin composition. The molded article is obtainable by molding the resin composition.

Examples of the molding method include compression molding, extrusion molding, film molding, tube molding, multilayer molding, blow molding, vacuum molding, transfer molding, injection molding, rotational molding, rotational lining molding, spinning molding, and electrostatic coating.

EXAMPLES

The invention is described with reference to examples, but the invention is not intended to be limited by these examples.

The parameters in the examples were measured by the following methods.

Composition of Copolymer

The composition of the copolymer was determined by $^{19}$F-NMR measurement using a nuclear magnetic resonance device AC300 (available from Bruker-Biospin) with the measurement temperature set to (melting point of the polymer+20)° C. For some integral values of the peaks and some types of the monomers, elemental analysis was combined as appropriate.

Comparative Example 1

First, 10% by mass of a copolymer of vinylidene fluoride (VdF) and tetrafluoroethylene (TFE) (resin A, VdF/TFE=93 mol %/7 mol %, melting point: 143° C., MFR: 30.5 g/10 min) and 90% by mass of poly(methyl methacrylate) (PMMA) (available from Mitsubishi Rayon Co., Ltd., trade name: Acrypet, model: VH001, melting point: not detected, MFR: 2.4 g/10 min) were pre-dried at 80° C. and dry blended. The blend was extruded through a Φ25-mm twin-screw extruder at a maximum temperature of 220° C., whereby a composite material in the form of pellets was obtained. The pellets were then compression-molded into a 1-mm-thick pressed sheet. The compression molding was performed under the following conditions: pre-heating at 200° C. for 10 min, molding at 220° C. and at 5 MPa for 1 min, and cooling with water at 5 MPa for 5 min. Separately, the pellets were injection-molded into a dumbbell piece (ASTM type V). The injection molding was performed at a resin temperature of 160° C. to 220° C. and a mold temperature of 30° C. to 40° C.

Comparative Example 2

A composite material in the form of pellets and molded articles thereof (pressed sheet and dumbbell piece) were prepared in the same manner as in Comparative Example 1, except that the amount of the resin A was changed to 30% by mass and the amount of PMMA was changed to 70% by mass.

Example 1

A composite material in the form of pellets and molded articles thereof were obtained in the same manner as in Comparative Example 1, except that the amount of the resin A was changed to 50% by mass and the amount of PMMA was changed to 50% by mass.

Example 2

A composite material in the form of pellets and molded articles thereof were obtained in the same manner as in Comparative Example 1, except that the amount of the resin A was changed to 60% by mass and the amount of PMMA was changed to 40% by mass.

Example 3

A composite material in the form of pellets and molded articles thereof were obtained in the same manner as in Comparative Example 1, except that the amount of the resin A was changed to 70% by mass and the amount of PMMA was changed to 30% by mass.

Example 4

A composite material in the form of pellets and molded articles thereof were obtained in the same manner as in Comparative Example 1, except that the amount of the resin A was changed to 80% by mass and the amount of PMMA was changed to 20% by mass.

Example 5

A composite material in the form of pellets and molded articles thereof were obtained in the same manner as in Comparative Example 1, except that 70% by mass of a copolymer of VdF and TFE (resin B, VdF/TFE=93 mol %/7 mol %, melting point: 141° C., MFR: 5.8 g/10 min) and 30% by mass of PMMA were used.

Comparative Example 3

A composite material in the form of pellets and molded articles thereof were obtained in the same manner as in Comparative Example 1, except that 50% by mass of a copolymer of VdF and TFE (resin C, VdF/TFE=80 mol %/20 mol %) and 50% by mass of PMMA were used.

Comparative Example 4

A composite material in the form of pellets and molded articles thereof were obtained in the same manner as in Comparative Example 3, except that the amount of the resin C was changed to 70% by mass and the amount of PMMA was changed to 30% by mass.

Comparative Example 5

A composite material in the form of pellets and molded articles thereof were obtained in the same manner as in Comparative Example 1, except that 50% by mass of a VdF polymer (PVdF, VdF/TFE=100 mol %/0 mol %) and 50% by mass of PMMA were used.

Comparative Example 6

A composite material in the form of pellets and molded articles thereof were obtained in the same manner as in Comparative Example 5, except that the amount of PVdF was changed to 70% by mass and the amount of PMMA was changed to 30% by mass.

Comparative Example 7

PMMA was pre-dried at 80° C. overnight, and then compression-molded into a 1-mm-thick pressed sheet. Separately, the pre-dried PMMA was injection-molded into a dumbbell piece. The molding conditions were the same as those in Comparative Example 1.

Comparative Example 8

The resin A was pre-dried at 80° C. overnight, and then compression-molded into a 1-mm-thick pressed sheet. Separately, the pre-dried resin A was injection-molded into a dumbbell piece. The molding conditions were the same as those in Comparative Example 1.

Comparative Example 9

The resin B was pre-dried at 80° C. overnight, and then compression-molded into a 1-mm-thick pressed sheet. Separately, the pre-dried resin B was injection-molded into a dumbbell piece. The molding conditions were the same as those in Comparative Example 1.

Comparative Example 10

The resin C was pre-dried at 80° C. overnight, and then compression-molded into a 1-mm-thick pressed sheet. Separately, the pre-dried resin C was injection-molded into a dumbbell piece. The molding conditions were the same as those in Comparative Example 1.

Comparative Example 11

PVdF was pre-dried at 80° C. overnight, and then compression-molded into a 1-mm-thick pressed sheet. Separately, the pre-dried PVdF was injection-molded into a dumbbell piece. The molding conditions were the same as those in Comparative Example 1.

Methods for Evaluating Molded Articles (Tensile Test)

Using the dumbbell piece (ASTM type V) produced by injection molding, the tensile stress and the tensile elongation were measured at a temperature of 23° C. and a test speed of 100 mm/min using universal material testing instrument (available from A&D Co., Ltd.) in conformity with ASTM D 638.

(Measurement of Light Transmittance)

Using the pressed sheet (1 mm thick) produced by compression molding, the light transmittance was measured using a spectrophotometer (available from Hitachi High-Tech Science Corp.). The light transmittance was measured at a measurement wavelength of 550 nm with the air taken as a blank.

(Measurement of Melt Flow Rate)

Using the resin composition (pellets) obtained through the twin-screw extruder, the MFR was measured using a melt index tester (available from Toyo Seiki Seisaku-sho, Ltd.). The measurement was performed at a temperature of 230° C. and a load of 5 kg.

(Differential Scanning Calorimetry)

Using the resin composition (pellets) obtained through the twin-screw extruder, the melting point was measured using a differential scanning calorimeter (DSC). The melting point was determined as the temperature corresponding to the maximum value on a heat-of-fusion curve obtained by increasing the temperature up to 200° C., decreasing the temperature down to 50° C., and again increasing the temperature up to 200° C., at a rate of 10° C./min.

The resin compositions with no temperature corresponding to the maximum value detected were indicated as (-) in the following table.

TABLE 1

|   |   | Comparative Example 1 | Comparative Example 2 | Example 1 | Example 2 | Example 3 | Example 4 | Example 5 | Comparative Example 3 | Comparative Example 4 |
|---|---|---|---|---|---|---|---|---|---|---|
| PMMA | mass % | 90 | 70 | 50 | 40 | 30 | 20 | 30 | 50 | 30 |
| Resin A | mass % | 10 | 30 | 50 | 60 | 70 | 80 |  |  |  |
| Resin B | mass % |  |  |  |  |  |  | 70 |  |  |
| Resin C | mass % |  |  |  |  |  |  |  | 50 | 70 |
| PVdF | mass % |  |  |  |  |  |  |  |  |  |
| Melt flow rate | g/10 min | 3.7 | 6.7 | 12.1 | 16.5 | 17.9 | 22.3 | 5.3 | 6.7 | 9.9 |
| Melting point | ° C. | — | — | — | 138 | 142 | 144 | 141 | — | — |
| Tensile stress | MPa | 93 | 77 | 59 | 40 | 39 | 33 | 38 | 55 | 41 |
| Tensile elongation | % | 7 | 19 | 50 | 78 | 100 | 147 | 95 | 32 | 41 |
| Light transmittance | % T | 84.3 | 85.3 | 84.0 | 92.3 | 86.5 | 86.4 | 86.1 | 76.1 | 78.0 |

|   |   | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| PMMA | mass % | 50 | 30 | 100 |  |  |  |  |
| Resin A | mass % |  |  |  | 100 |  |  |  |
| Resin B | mass % |  |  |  |  | 100 |  |  |
| Resin C | mass % |  |  |  |  |  | 100 |  |
| PVdF | mass % | 50 | 70 |  |  |  |  | 100 |
| Melt flow rate | g/10 min | 6.0 | 6.8 | 2.4 | 30.5 | 5.8 | 17.0 | 6.1 |
| Melting point | ° C. | 165 | 170 | — | 143 | 141 | 139 | 174 |
| Tensile stress | MPa | 57 | 44 | 98 | 40 | 38 | 44 | 56 |
| Tensile elongation | % | 27 | 54 | 6 | 25 | 21 | 41 | 61 |
| Light transmittance | % T | 86.0 | 22.6 | 84.3 | 18.5 | 18.7 | 0.6 | 4.5 |

The symbol "—" in the row of "Melting point" indicates that the melting point was not detected.

INDUSTRIAL APPLICABILITY

The resin composition of the invention elongates well and has excellent transparency, and thus can suitably be used in a wide range of fields, such as films for lamination, films for adhesive tape, agricultural films for tunnel greenhouses or pipe greenhouses, electrically insulating films, films for heavy duty packaging, films for solar cells, optical films, films for liquid crystal displays, design films, shrink films, parts for automobiles, parts for household appliances, parts for medical service, construction parts, plastic fiber optics, headlights of automobiles, touchscreens, and film sensors.

The molded article of the invention elongates well and has excellent transparency, and thus can suitably be used as any of films for lamination, films for adhesive tape, agricultural films for tunnel greenhouses or pipe greenhouses, electrically insulating films, films for heavy duty packaging, films for solar cells, optical films, films for liquid crystal displays, design films, shrink films, parts for automobiles, parts for household appliances, parts for medical service, construction parts, plastic fiber optics, headlights of automobiles, touchscreens, film sensors, and others.

The invention claimed is:

1. A molded article obtained by molding a resin composition comprising a fluorine-containing polymer and a methyl methacrylate resin,
  the fluorine-containing polymer and the methyl methacrylate resin having a mass ratio of 50/50 to 80/20, the fluorine-containing polymer containing a vinylidene fluoride unit and a tetrafluoroethylene unit, the vinylidene fluoride unit and the tetrafluoroethylene unit having a mole ratio of 91/9 to 94/6, wherein the resin composition is a composite material for molding in the form of powder, flakes, or pellets, a tensile elongation of the molded article is 50-147% as measured at a temperature of 23° C. and a test speed of 100 mm/min using universal material testing instrument, and a light transmittance of the molded article is 84.0-92.3% T as measured at a measurement wavelength of 550 nm with the air taken as a blank using a 1 mm thick sheet.

2. The molded article according to claim 1, wherein the mass ratio is 55/45 to 75/25.

3. The molded article according to claim 1, wherein the fluorine-containing polymer has a melt flow rate of 0.1 to 100 g/10 min.

4. The molded article according to claim 1, wherein the molded article has a tensile elongation of 78-147% as measured at a temperature of 23° C. and a test speed of 100 mm/min using universal material testing instrument, and a light transmittance of 86.1-92.3% T as measured at a measurement wavelength of 550 nm with the air taken as a blank using a 1 mm thick sheet.

* * * * *